United States Patent

[11] 3,603,151

[72] Inventor Herbert J. Zurstadt
  Grosse Pointe Park, Mich.
[21] Appl. No. 833,306
[22] Filed June 16, 1969
[45] Patented Sept. 7, 1971
[73] Assignee Dresser Industries, Inc.
  Dallas, Tex.

[54] GAS ADSORPTION THERMOMETER
  12 Claims, 7 Drawing Figs.
[52] U.S. Cl. ................................................. 73/368.6,
  73/430
[51] Int. Cl. ................................................. G01k 5/36
[50] Field of Search .................................. 73/368.6,
  393, 414, 417, 411, 430; 116/129 B

[56] References Cited
  UNITED STATES PATENTS
  1,430,688  10/1922  Schlaich ................. 73/368.6 X
  1,518,939  12/1924  Schlaich ................. 73/411 X
  1,521,343  12/1924  Townsend ............... 73/368.6 X
  1,724,520   8/1929  Schlaich ................. 73/368.6 X
  2,695,776  11/1954  Burg ..................... 73/430 X
  3,163,046  12/1964  Huston ................... 73/418
  3,213,688  10/1965  Huston ................... 73/368.6 UX
  3,410,141  12/1968  Zurstadt ................. 73/368.6

FOREIGN PATENTS
  824,564  7/1939  Germany .................... 73/414

Primary Examiner—Louis R. Prince
Assistant Examiner—Daniel M. Yasich
Attorney—Mayer, Rubin, Majesko, Winkle, Johnson, Hubbard and Scott ABSTRACT: A gas adsorbent thermometer comprising an external housing; a temperature indicating member; means defining a chamber interiorly of the housing; a shaft member having one end thereof supporting the indicator member for rotational movement relative to the housing and the opposite end thereof disposed within the chamber; a multiconvolution helical Bourdon tube disposed within the chamber and arranged coaxially of the shaft; the chamber being provided with a quantity of fluid for dampening movement of the Bourdon tube relative to the housing; bearing means for rotatably supporting the shaft and constructed such that the fluid within the chamber will not leak therefrom regardless of the relative orientation of the housing; a takeoff member extending between the Bourdon tube and the shaft and adapted to impart rotary movement to the shaft in response to winding and unwinding movement of the Bourdon tube; a temperature sensing bulb containing a mass of gas adsorbent material, and a capillary tube communicating the bulb with the Bourdon tube.

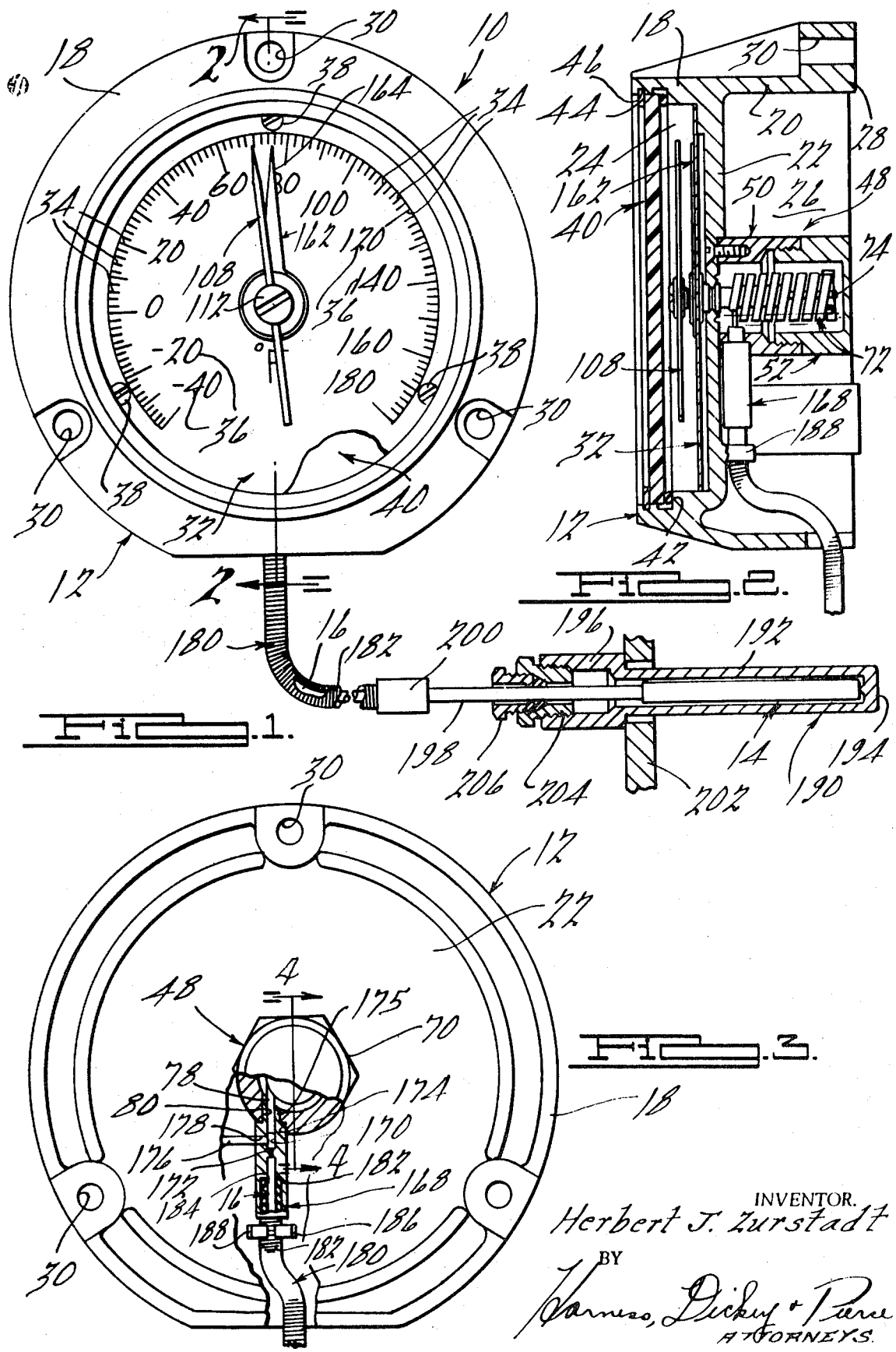

INVENTOR.
Herbert J. Zurstadt
BY
Harness, Dickey & Pierce
ATTORNEYS

GAS ADSORPTION THERMOMETER

BACKGROUND OF THE INVENTION

Conventional gas-actuated thermometers operate on a principle of Charles' Law, which states that the absolute pressure of a confined gas is proportional to the absolute temperature. In the construction of gas-actuated thermometers, the capillary and Bourdon tube volumes are kept as small as possible, as compared with the sensing bulb volume, so as to prevent an appreciable percentage of the gas mass within the bulb from egressing from the bulb in the presence of a temperature increase. In typical gas-actuated thermometers, the capillary and Bourdon tubes are subjected to varying ambient temperatures which cause changes in internal pressure, resulting in ambient errors and, accordingly, conventional gas-actuated thermometers use relatively large bulbs (typically ¾ inch O.D. by 10% inches long, volume = 77.1 cc.), in order to minimize capillary error, and a bimetallic link to compensate for ambient error in the Bourdon tube. For many applications, for example where space is at a premium, large bulbs are impractical to use, and have necessitated the use of mercury actuated thermometers or vapor-filled thermometers instead of gas-actuated thermometers. However, in many cases, the use of mercury thermometers is prohibited due to the poisonous vapors associated therewith, while vapor-filled thermometers have been similarly objectionable since they are notoriously nonlinear and consequently inaccurate.

To meet the need for those applications where conventional gas-actuated thermometers, as well as mercury and vapor-filled thermometers are not practical, gas adsorbent thermometers have been developed. Typically, such gas adsorbent thermometers utilize a bulb filled with an adsorbent material, for example, activated carbon, which has an ability to adsorb very large quantities of certain gases. As a result, the associated Bourdon tube can be made much smaller and less sensitive, as can the bulb, which may be reduced to a typical size of ⅜ inch O.D. by 3½ inches long, volume = to 6.34 cc.

Gas adsorption thermometers heretofore known and used have incorporated spiral shaped Bourdon tubes, for example, see U.S. Letters Pat. No. 3,410,141, and while being adequate to overcome the objectionable characteristics of the prior used gas-actuated and mercury and vapor-filled thermometers, have been found to be objectionable in and of themselves due to the fact that gas adsorbent systems are impractical since the temperature-pressure relationship will shift when any one of a number of parameters, such as bulb size, capillary bore and length, Bourdon tube volume, linearity or ambient error is changed. The net result is that extensive testing is required in order to select proper amounts of adsorbent materials and associated gases. For example, as the capillary length is changed any appreciable amount, the added volume causes a displacement of the pressure-temperature curve, and it is therefore necessary to change the pressure calibration of the spiral Bourdon tube and housing subassembly for each change of capillary length. Thus, in a construction where, for example, seven capillary lengths for each of five different temperature ranges might be available for a manufacturer to choose from, a total of 35 combination Bourdon tubes and capillary tubes of preselected lengths would have to be determined. For each combination, a specific Bourdon tube and housing subassembly would have to be fabricated and pressure calibrated before assembly to the appropriate capillary tube and bulb. Then, based on known development data, a temperature dial would have to be printed which corresponded with the charged temperature unit assembly. Subsequently, when the unit was temperature calibrated, tedious adjustment would be necessary, frequently requiring repeated and the use of calibration fixtures in order to check the span and concentricity adjustments to meet required calibration accuracy.

The present invention is intended to overcome the above-described objectionable characteristics of heretofore known and used spiral Bourdon-tube gas adsorption thermometers through the provision of a novel thermometer design which eliminates the need for tedious and repeated pressure calibrations, as well as the need for concentricity adjustments. The thermometer construction of the present invention accomplishes the above through the utilization of a helical shaped Bourdon tube which is arranged coaxially of a rotatable shaft which supports the temperature indicator member or pointer. The shaft is operatively connected to the Bourdon tube by means of a takeoff member that extends radially between the shaft and the Bourdon tube, resulting in a design which permits assembly and charging of the unit without prior adjustment of the Bourdon tube subassembly. This is possible due to the fact that the concentricity adjustment is eliminated by using a helical Bourdon tube and a shaft bearing each supported upon the same structural element, and that in order to accommodate the unit for different capillary tube lengths, the only span adjustment that is needed is to adjust the relative rotational position of the takeoff member with respect to the Bourdon tube.

A particular feature of the present invention resides in the provision of an enclosure internally of the thermometer housing which defines a fluid chamber within which the Bourdon tube is operatively disposed. The chamber is partially filled with fluid, typically silicon oil, which acts as a damping medium to prevent excess movement of the Bourdon tube when the thermometer is subjected to extreme shock or vibration. The enclosure is provided with a unique bearing arrangement which rotatably supports the aforementioned shaft in an extremely friction free manner and is designed such that no ancillary seals or packings are necessary to prevent the damping fluid from leaking out of the enclosure. Another feature of the present invention resides in the provision of a novel ambient compensator which is adapted to be operatively associated with the helical Bourdon tube so as to take up a minimum amount of space within the thermometer housing, yet function in an extremely effective manner in assuring positive compensation for ambient temperature changes. As will hereinafter be described in detail, the gas adsorption thermometer of the present invention will be found to be of an extremely durable and rugged construction without any sacrifice in accuracy, with the result that the thermometer will find particularly useful application under even the most deleterious working conditions.

SUMMARY OF THE INVENTION

This invention relates generally to gas thermometers and, more particularly, to a new and improved gas adsorption thermometer featuring a helical Bourdon tube for effecting preselected movement of an associated temperature-indicating element.

It is, accordingly, a general object of the present invention to provide a new and improved gas adsorption thermometer.

It is a more particular object of the present invention to provide a new and improved gas adsorption thermometer which utilizes a helical Bourdon tube.

It is a related object of the present invention to provide a gas adsorption thermometer of the above character which utilizes a fluid chamber for preventing excess movement of the Bourdon tube in the presence of vibration and shock.

It is still a more particular object of the present invention to provide a new and improved gas adsorption thermometer of the above-described type having a novel bearing construction for rotatably supporting a shaft operatively connecting the Bourdon tube with the temperature indicator element, which bearing means is designed so as to support the shaft without the use of any fluid seals, packings or the like, but still positively prevent leakage of the associated damping fluid regardless of the relative orientation of the thermometer housing.

It is another object of the present invention to provide a new and improved gas adsorption thermometer which features a novel Bourdon tube and ambient compensator arrangement.

It is a further object of the present invention to provide a new and improved gas adsorption thermometer which is adapted to have the aforesaid rotatable shaft selectively adjusted with respect to the Bourdon tube in an extremely simple manner in order to compensate for capillary length.

It is yet a further object of the present invention to provide a gas adsorption thermometer which is extremely accurate in operation over a relatively large temperature range.

It is a related object of the present invention to provide a gas adsorption thermometer which is of a relatively simple design, is economical to commercially manufacture, easy to assemble and is extremely rugged and durable in operation.

Other objects and advantages of the present invention will become apparent from the following detailed description taken in conjunction with the accompanying drawings.

BRIEF DESCRIPTION OF THE DRAWINGS

FIG. 1 is a side elevational view, partially broken away, of a gas adsorption thermometer in accordance with the principles of the present invention.

FIG. 2 is a cross-sectional view taken substantially along the line 2—2 of FIG. 1.

FIG. 3 is a side elevational view of the rearward side of the gas adsorption thermometer of the present invention.

DETAILED DESCRIPTION OF THE PREFERRED EMBODIMENTS

Figure 4:
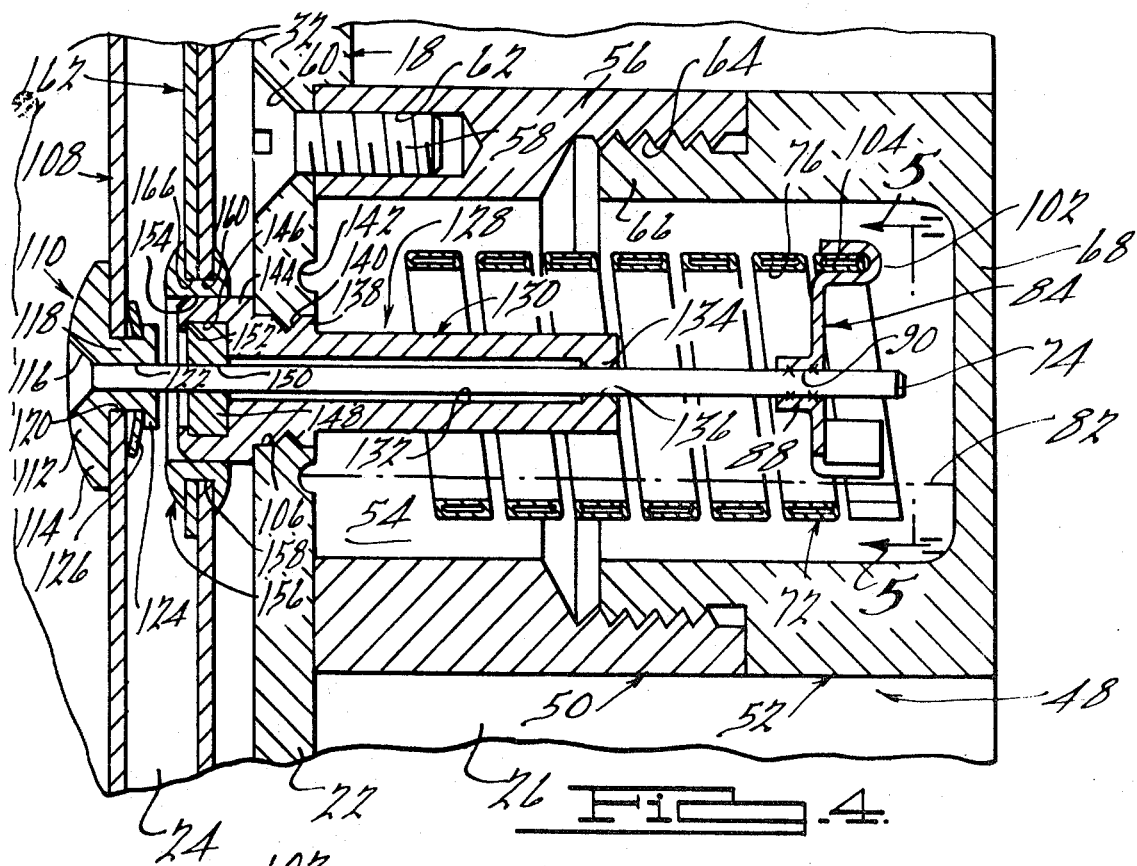
FIG. 4 is a cross-sectional view taken substantially along the line 4—4 of FIG. 3.

For purposes of clarity of description, the terms "forwardly" and "rearwardly" will have reference to the front and rear sides of the thermometer assembly of the present invention, with the forward side thereof being at the left side of FIG. 2 and the rearward side being at the right side of said Figure. Similarly, the terms "radially inwardly," "radially outwardly" and derivatives thereof will have reference to the geometric center of the thermometer assembly of the present invention and the various components and subcomponents thereof.

Referring now to the drawings and in particular to FIG. 1, a gas adsorption thermometer 10 is shown as generally comprising a temperature-indicating assembly 12, a remotely located temperature sensing unit or bulb 14 and a capillary tube 16 which operatively connects and communicates the assembly 12 with the bulb 14. As will hereinafter be described in detail, the bulb 14 is adapted to be operatively mounted in some preselected location, the temperature of which is to be sensed thereby, while the assembly 12 is located remote from the bulb 14 and is designed to provide an accurate visual indication of the temperature conditions at the location of the bulb 14.

As best seen in FIG. 2, the temperature-indicating assembly 12 comprises a generally cup-shaped housing 18 which is preferably fabricated of a lightweight material such as die cast aluminum and includes an annular sidewall section 20 and a generally radially extending wall section 22. The housing sections 20, 22 define forward and rearward cavities of compartments 24 and 26, respectively, that are separated by the wall section 22. The rearward end of the annular sidewall section 20 is formed with an enlarged thickness mounting section 28 which is formed with an enlarged thickness mounting section 28 which is formed with a plurality (preferably three), of axially extending openings 30 adapted to receive suitable mounting screws, bolts or the like (not shown) for operatively mounting the assembly 12 on a suitable mounting wall, structure or the like (not shown) as will be apparent.

Disposed interiorly of the compartment 24 is a generally flat, radially extending dial plate 32 which is preferably provided with temperature graduations or marks, generally designated 34, and appropriate temperature-indicating numerals 36 that correspond to the temperature range or conditions with which the thermometer 10 is operatively associated. The dial plate 32 is preferably operatively secured in generally spaced parallel relation with the wall section 22 by means of a plurality of suitable mounting screws, bolts or the like 38, as best seen in FIG. 1. The compartment 24 is preferably closed to the atmosphere by a generally disc-shaped transparent cover member 40 which may, for example, be fabricated of glass or a suitable transparent shock resistant plastic material as is well known in the art. The cover member 40 is operatively mounted within the housing 18 by having the outer marginal edge portion thereof compressingly received between a generally resilient O-ring backup element 42 and an annular snap or retaining ring 44, the latter of which is operatively mounted within an annular, radially outwardly extending recess 46 formed around the inner periphery of the wall section 20, as best seen in FIG. 2.

Disposed within the compartment 26 of the assembly 12 is a centrally located, generally cylindrically shaped enclosure 48 which consists of a pair of generally cylindrically shaped interengageable members 50 and 52 that define an internal chamber, generally designated 54. The member 50 comprises a generally cylindrical shaped wall 56 that is adapted to abuttingly and sealingly engage the rearward side of the wall section 22 of the housing 18 and be fixedly secured thereto by means of a plurality of circumferentially spaced, axially extending screws, bolts or the like 58 that extend through suitable countersunk bores 60 in the wall section 22 and are threadably received within suitable internally threaded bores 62 in the wall 56. The end of the wall 56 opposite that which abuts against the wall section 22 is formed with an internally threaded counterbore 64 which is adapted to receive an externally threaded, reduced diameter wall portion 66 formed on the forward end of the member 52, the opposite end of the member 52 comprising a generally radially extending end section 68 which covers the rearward end of the chamber 54 upon suitable threadable engagement of the members 50 and 52, as illustrated in FIG. 4. Preferably, the members 50, 52 are fabricated of bronze or a similar corrosion resistant, relatively easily machined metallic material, with the member 52 preferably being fabricated of a plurality of axially extending, circumferentially spaced wrench engaging surfaces or facets 70 (see FIG. 3) adapted to facilitate threadably securing and unsecuring the member 52 to the member 50 by means of a suitable wrenchlike tool or the like.

Disposed within the interior of the chamber 54 is an elongated, multiconvolution helical Bourdon tube, generally designated 72, which is arranged coaxially of the chamber 54 and is adapted to function in a manner hereinafter to be described to effect preselected movement of a temperature-indicating member via an elongated cylindrical shaft member 74, in response to changes in internal pressure within the tube 72, as is well known in the gas-filled thermometer art. As illustrated, the convolutions of the Bourdon tube 72 are generally oval-shaped in transverse cross section and define therewithin, a continuous helical passage 76 that is communicable with the interior of the bulb 14 in a manner hereinafter to be described. In particular, the rearward end of the Bourdon tube 72 is sealed to the atmosphere in a conventional manner, while the forward end thereof terminates in a generally hollow tubular section 78 (see FIG. 3) which extends through a radially outwardly directed bore 80 formed in the member 50, whereby to communicate with the capillary tube 16 and bulb 14 in a manner later to be described. Preferably, the Bourdon tube 72 is fabricated of beryllium copper, as opposed to conventional metallic materials such as nickel or ferrous alloys, due to the fact that the modulus of elasticity of beryllium copper permits the number of turns or convolutions of the tube 72 to be considerably reduced, yet achieve a preselected amount of movement of the associated temperature-indicating element, thereby permitting the Bourdon tube 72 to be relatively compact in size, while reducing the ambient error due to the consequential reduction in internal volume in the tube 72.

In accordance with one of the principles of the present invention, the chamber 54 is intended to be supplied with and contain a preselected quantity of a relatively viscous fluid material which is adapted to be arranged in generally surrounding relation with at least a portion of the helical Bourdon tube 72 and thereby function to limit or dampen movement of the tube 72 when the assembly 12 which is subjected to shock, vibration or other movement which might impart relative movement to the Bourdon tube 72. While such damping fluid may comprise any one of a number of materials well known in the art, said fluid preferably is in the form of a silicon oil having a viscosity of approximately 18,000 centistokes, although this viscosity may be varied in accordance with the operating conditions with which the thermometer 10 may be associated. As will hereinafter be described, the quantity of vibration and shock-damping fluid with which the chamber 54 may be supplied is selected such that a portion of the Bourdon tube 72 is engaged or submerged within said fluid regardless of the particular orientation of the assembly 12, with the result that said fluid will be effective in achieving its damping function when the assembly 12 is oriented in the position shown in FIGS. 1 and 2, or in virtually any other orientation. Normally, however, said fluid will reside in the lower portion of the chamber 54, as indicated by the fluid level line 82, whereby a portion of each of the convolutions of the Bourdon tube 72 will be submerged within the fluid.

Figure 5:
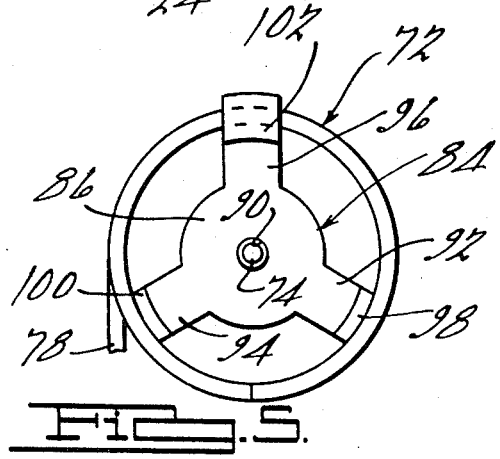
FIG. 5 is a side elevational view of a portion of the structure illustrated in FIG. 3, as seen in the direction of the arrow 5 thereof.

The rearward end of the shaft 74 is adapted to be fixedly secured to the rearward end or rearwardmost convolution of the helical Bourdon tube 72 by means of a generally designated radially extending takeoff or spider member, generally designated by the numeral 84. The member 84 comprises a central, generally disc-shaped section 86 which is formed with an axially extending tubular flange portion 88 that defines a central axially extending bore 90 within which the rearward end of the shaft 74 extends and is fixedly secured. Preferably, the shaft 74 is secured within the bore 90 by means of soldering or the like. Projecting radially outwardly from the section 86 are three equally circumferentially spaced arm sections 92, 94 and 96. The sections 92, 94 are formed with rearwardly extending portions 98 and 100 which are disposed directly adjacent the inner periphery of the Bourdon tube 72 and are adapted to serve a stabilizing or centralizing function in maintaining the Bourdon tube 72 concentrically oriented with respect to the shaft 74. The arm section 96 is formed with a generally U-shaped mounting portion 102 and defining a forwardly confronting slot or recess 104 within which the rearwardmost convolution of the Bourdon tube 72 is received and fixedly secured, as best seen in FIGS. 4 and 5. With the above construction, it will be seen that winding and unwinding movement of the Bourdon tube 72, in response to variations in pressure therewithin, will cause rotational movement of the shaft 74 via the member 84. As will be apparent to those skilled in the art, the Bourdon tube 72 is particularly suited for temperature indication because of its substantially linear response to pressure changes, i.e., each unit of pressure change produces substantially the same rotational movement or deflection of the shaft 74. Accordingly, movement of the temperature indicator will be proportional to winding and unwinding movement of the tube 72. A particular feature of the above described construction resides in the fact that the assembly 12 may be adjusted for temperature span by merely adjusting the relative rotational position of the takeoff member 84 with respect to the Bourdon tube 72. This may be accomplished merely by unsecuring the U-shaped mounting portion 102 of the member 84 from the rearward end of the Bourdon tube 72, and after the member 84 as well as the shaft 74 secured thereto is rotated some preselected amount, the section 102 may be again secured, as by mechanically crimping or soldering or the like, to the end of the tube 72.

The forward end of the shaft 74 extends coaxially through a central opening 106 formed in the housing section 22 and is secured to a generally radially disposed temperature-indicating element or pointer 108 disposed between the dial plate 32 and the cover plate 40 by means of a clutch mechanism, generally designated 110. The mechanism 110 is comprised of a hub member 112 that includes an enlarged diameter head section 114 formed with a diametrically extending slot 116 on the forward side thereof. The head section 114 is integrally connected to a reduced diameter section 118 that extends through a centrally located opening 120 in the pointer 108 and is formed with a central, axially extending bore 122 within which the forward end of the shaft 74 is received and is fixedly secured. The rearward end of the section 118 is formed with a radially outwardly extending shoulder portion 124 which is adapted to function as an abutment means for the rearward side of a generally conical spring element 126 disposed directly rearwardly of the pointer 108. In operation, the spring element 126 is adapted to exert a resilient forwardly directed force against the rearward side of the pointer 108 and thereby compressingly engage the pointer 108 with the rearward side of the head section 114 of the hub member 12, whereby the pointer 108 is mounted for rotational movement relative to the hub member 112, but which rotational movement is frictionally resisted by the spring element 126. At such time as it is desired to effect relative rotational movement of the pointer 108 with respect to the shaft 74, i.e., for purposes of adjustment, calibration or the like, a suitable screwdriverlike tool may be inserted within the slot 116 to hold the hub member 112 stationary, and a rotational force may then be exerted upon the pointer 108 until the desired relative movement thereof with respect to the shaft 74 is achieved. As will be apparent, rotational movement of the shaft 74 in response to winding or unwinding of the Bourdon tube 72 will effect a corresponding rotational movement of the pointer 108, resulting in the pointer 108 registering with the graduated markings 34 and numerals 36 on the dial plate 32 to indicate the relative temperature of the environment in which the hub 14 is located.

The shaft 74 is adapted to be rotatably supported with respect to the enclosure 48 and housing 18 by means of a bearing assembly, generally designated 128, comprising an elongated, generally cylindrically shaped bearing member 130 that extends coaxially of the shaft 74. More particularly, the bearing member 130 is formed with an internal, axially extending centrally located bore 132 through which the forward end of the shaft 74 extends, as best seen in FIG. 4. The rearward end of the member 130 terminates approximately midway between the ends of the chamber 54 and is formed with a reduced diameter or necked-down section 134 which defines a reduced diameter opening 136, the opening 136 being slightly larger in diameter than the shaft 74 and functioning to rotatably support an intermediate portion thereof. The bearing member 130 is formed with an enlarged diameter section 138 having a generally V-shaped recess 140 formed around the outer periphery thereof, which section 138 extends through the opening 106 in the housing section 22 and is disposed in radial alignment therewith. In order to fixedly secure the bearing member 130 within the housing 18, the member 130 is operatively positioned as shown in FIG. 4 and a suitable staking or similar deforming tool is forced into engagement with the rearward side of the section 22, thereby causing a portion of the section 22 circumjacent the opening 106 to be deformed, as seen at 142, and be forced radially inwardly with respect to the periphery of the opening 106 into the V-shaped recess 140, thus positively securing the bearing member 130 in place. Immediately forwardly of the section 138, the bearing member 130 is formed with still a larger diameter section 144 which defines an enlarged bore 146 arranged coaxially of the bore 132 and adapted to operatively receive an annular or ring-shaped bushing member 148 defining an internal bore 150 through which the forward end of the shaft 74 extends, the bushing 148 thereby serving to rotatably support the shaft 74 within the forward end of the bearing member 130 and at a position spaced axially forwardly from the bearing portion 134. The forwardmost portion of the bearing member section 144 is crimped or similarly deformed radially inwardly, as seen at 152, over the forward side of the bushing 148, whereby to preclude any relative axial movement of the bushing 148 with respect to the bearing member 130.

It will be seen from the above that the bearing assembly 128 is adapted to support the shaft 74 for free rotational movement in extremely friction-free manner, thereby enhancing the accuracy of the thermometer 10 of the present invention. A particular feature of the above described construction resides in the fact that no fluid seals, packings or the like are required in order to prevent the damping fluid from leaking out of the chamber 54. The reason for this is that the quantity of fluid provided in the chamber 54 is selected such that the upper level thereof is spaced below the bearing assembly 128 when the assembly 12 is mounted in the position illustrated in FIG. 4 and since the rearward end of the assembly 128 terminates approximately midway between the forward and rearward ends of the chamber 54, the fluid level will always be spaced away (below) from the rearward end of the assembly 128 when the assembly 12 is disposed in either a "face up" or "face down" configuration, or any angle therebetween. Thus, the damping fluid may function in effectively preventing movement of the Bourdon tube 72 in the presence of vibration or shock of the assembly 12, yet will not leak out of the chamber 54 due to the unique construction of the present invention.

The section 144 of the bearing member 130 extends partially through a central annular bore 154 defined by a generally ring-shaped hub element 156, the outer periphery of which is formed with a radially inwardly extending recess 158 as best seen in FIG. 4. The element 156 extends through a central opening 160 formed in the dial plate 32, with the periphery of the opening 160 being nestingly received within the recess 158, as illustrated. The hub element 156 is also adapted to operatively support a rotatable reference pointer 162 having an outer end section 164 adapted to register or align with the numerals 36 on the dial plate 32. The radially inner end of the member 162 is formed with an annular bore 166, the periphery of which is nestingly received within the recess 158 in the same manner as the periphery of the opening 160 of the dial plate 32. Preferably, the axially forward and rearward sides of the hub element 156 exert a certain amount of axially compressive force against the dial plate 32 and pointer 162, whereby to resist relatively free pivotal movement of the member 162 with respect to the dial plate 32, yet permit the member 162 to be rotatably positioned when a preselected amount of rotational force is exerted thereon.

Referring now to FIGS. 2 and 3, it will be seen that the assembly 12 comprises a hollow or tubular connector member, generally designated 168, which functions to operatively connect one end of the capillary tube 16 to the enclosure 48. More particularly, the connector member 168 defines an elongated centrally located bore 170 which is formed with a reduced diameter intermediate portion 172, as seen in FIG. 3. The outer periphery of the member 168 is generally cylindrical in shape and is adapted to be received within an enlarged diameter counterbore 174 formed at the radially outer end of the aforementioned bore 80 in the wall 56 of the enclosure member 50, the connector member 168 terminating at the inner end thereof in a reduced diameter section 175 which is received within the bore 80 upon insertion of the member 168 into the counterbore 174, as illustrated. The member 168 is preferably fixedly secured to the enclosure 48 by having the radially inner end thereof silver soldered or similarly connected within the bore 80 and the counterbore 174. Upon operatively mounting the member 168 upon the enclosure 48, the tubular end section 78 of the helical Bourdon tube 72 is adapted to be inserted into the inner end of the bore 170, which bore 170 is also communicable with a charging tube or conduit 176 that is adapted to be inserted within an outwardly extending bore 178 formed in the connector member 168 at a position generally at right angles to and communicable with the bore 170. The charging conduit 176 is adapted to function in a manner to be described in connection with the overall operation of the thermometer 10 of the present invention in permitting the thermometer system to be charged with a suitable absorbent gas.

As best seen in FIGS. 1 and 3, the capillary tube 16 is encased in an exterior protective covering or armor 180 consisting of a single length of relatively heavy gauge wire 182 wound in a tight helical configuration with the successive convolutions thereof disposed in generally edge abutting relation to one another. The end of the armor 180 adjacent the assembly 12 is adapted to be received within an enlarged diameter counterbore 184 formed in the outer end of the connector member 168, with the end of the member 168 preferably being staked or similarly deformed radially inwardly into tight peripheral engagement with the armor 180 to fixedly secure the same to the member 168. It will be seen in FIG. 3 that the end of the capillary tube 16 adjacent the assembly 12 extends out of the armor 180 so that upon operative insertion of the armor 180 into the counterbore 184, the capillary tube 16 will extend longitudinally within the bore 170 into abutment with the reduced diameter portion 172 therewithin. In order to assure against inadvertent disconnection or separation of the capillary tube 16 and armor 180 therefore from the connector member 168, the rearward side of the housing section 22 is provided with a pair of rearwardly extending spaced apart retaining tabs or ears 186 and 188 which are arranged in general radial alignment with the connector member 168 and are adapted to have the armor 180 extend therebetween, whereby the tabs 186, 188 may be deformed toward one another and into clamping engagement with the outer periphery of the armor 180 to assure against relative movement between the armor 180 and assembly 12.

As illustrated in FIG. 1, the bulb 14 is operatively mounted within an elongated, generally tubular shaped well 190 having a generally cylindrically shaped sidewall section 192 which terminates at one end thereof at an end wall 194 and at the opposite end in an enlarged diameter mouth section 196. The bulb 14 is disposed interiorly of the well 190 and is connected to an elongated tubular sleeve 198 which is in turn connected by a suitable crimped and soldered connection 200 to the armor 180, with the sleeve 198 forming what is sometimes termed a bendable extension since it is preferably adapted to be curved at various angles at different preselected points therealong, depending upon the relative position of the assembly 12 and the associated structure, representatively designated by the numeral 202, adapted to operatively support the bulb 14 and well 190 in a predetermined temperature environment. The sleeve 198, and hence the bulb 14, is operatively secured within the well 190 by means of conventional cooperable union and jamb nuts 204 and 206, the former of which is adapted to be threadably received within the mouth section 196 of the well 190, as is well known in the art. As will be apparent, various alternate means may be used for operatively securing the bulb 14 within the well 190, but due to the long developed use of the union and jamb nut concept, the elements 204, 206 are preferred due to their wide availability, simple construction and economical cost.

Preparatory to operation, the bulb 14, capillary tube 16 and helical Bourdon tube 72 are adapted to be charged with any suitable inert gas, such as helium, neon, argon, xenon, or krypton, depending upon the particular temperature range with which the thermometer 10 is to be operatively associated. Such charging of the thermometer system is achieved by communicating the gas through the charging tube 176, and after a preselected internal pressure has been achieved, the tube 176 may be crimped closed or otherwise properly sealed to the atmosphere. Prior to the gas charging operation, the bulb 14 is filled with a predetermined quantity of a gas adsorbing material which is preferably in the form of discrete granules. These granules may be formed of various different adsorbent materials, such as activated carbon, activated alumina, silica gel, or zeolites, depending upon the intended application of the thermometer 10. In operation, at relatively low temperatures, the gas adsorbent material or granules cause the gas modules of the charged system to be adsorbed therein, whereby a relatively smaller number of free gas modules remain in the system defined by the bulb 14, capillary tube 16 and helical Bourdon tube 72. As the temperature of the bulb 14 is increased, gas molecules are evolved from the granular adsorbent material, thereby increasing the number of free gas molecules and producing a corresponding pressure increase in the system. The pressure increase results in an unwinding movement of the helical Bourdon tube 72, with the consequent rotary movement of the shaft 74 and pointer 108. The movement of the pointer 108 is proportional to the temperature change of the bulb 14 so that a linear relationship exists between the temperature change and movement of the pointer 108. At such time as the temperature of the bulb 14 decreases, a certain number of the free molecules will again be adsorbed into the adsorbent granules, resulting in a pressure decrease in the system, with the consequent winding movement of the helical Bourdon tube 72 and a corresponding rotational movement of the pointer 108 via the shaft 74.

Figure 6:
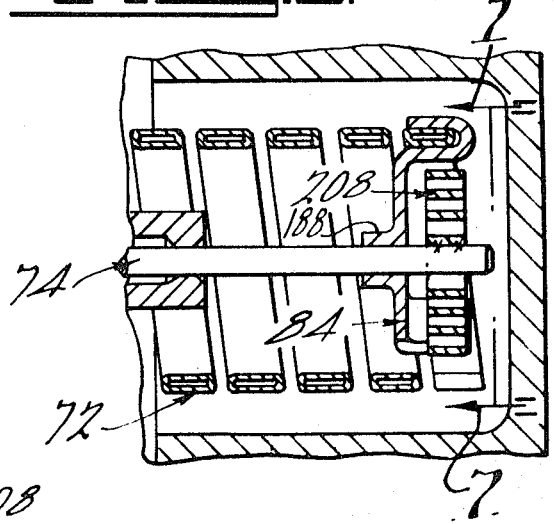
FIG. 6 is a side elevational view of an alternate embodiment of the present invention.
Figure 7:
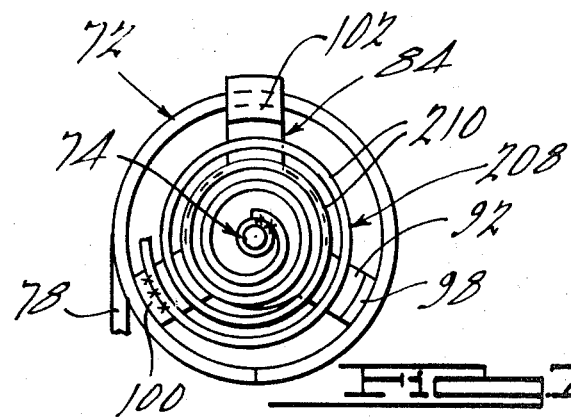
FIG. 7 is a cross-sectional view taken substantially along the line 7—7 of FIG. 6.

FIGS. 6 and 7 illustrate a slightly modified embodiment of the present invention wherein the assembly 12 is provided with an ambient compensator device, generally designated by the numeral 208, which is adapted to be connected between the helical Bourdon tube 72 and the shaft 74 in order to compensate for ambient temperature changes which may occur. More particularly, the device 208 is in the form of a generally spiral shaped bimetallic element comprising a series of convolutions, generally designated 210, that are generally radially aligned with one another so that the device 208 is relatively compact in size. The device 208 is constructed such that the diameter of the outermost or largest convolution 210 is slightly smaller in size than the inner diameter cavity or space defined between the portions 98, 100 and 102 of the spider 84, with the result that the device 208 is adapted to be nestingly received within the spider 84 in a manner best illustrated in FIG. 6. By thus hub 14 the device 208 formed in a generally spiral conformation and adapted to be nestingly received within the confines of the generally helical shaped Bourdon tube 72, the entire unit will be seen to be extremely compact in size so as to find particularly useful applications where space is at a premium.

As best seen in FIG. 7, the outer end of the device 208, i.e., the free end of the outermost convolution 210, is adapted to be fixedly secured, as by soldering or the like to the inner side of the spider portion 102, whereas the inner end of the device 208, i.e., the free end of the innermost convolution 210, is adapted to be fixedly secured to the periphery of the rearward end of the shaft 74. It will be noted that when the ambient compensator device 208 is employed in the assembly 12, the tubular portion 88 of the spider 84 is not secured as by soldering or any other means to the shaft 74 so that the shaft 74 is free to rotate, within the limits of the device 208, relative to the periphery of the bore 90 defined by the portion 88.

The ambient compensator device 208 may be fabricated of any suitable bimetallic construction commensurate with the particular application in which the thermometer 10 is to be used. By way of example, the device 208 may be of a construction manufactured and distributed by W. M. Chase Co. and designated as type 2400. It will be apparent, of course, that the particular size and relative spacing between the convolutions 210 may be varied in accordance with the size of the associated helical Bourdon tube 72. In operation, the ambient compensator device 208 is adapted to wind or unwind in response to ambient temperature changes, whereby to effect preselected rotational positioning of the shaft 74 with respect to the helical Bourdon tube 72. That is, it will be seen that upon unwinding movement of the device 208, the shaft 74 will be rotated in one direction relative to the Bourdon tube 72, whereas winding of the device 208 will effect rotational movement of the shaft 74 in the opposite direction, the particular direction of rotational movement of the shaft 74 being determined by which side, i.e., low expansion side or high expansion side, of the bimetallic device 208 faces radially outwardly or inwardly, with the preferred construction of the present invention having the low expansion side of the device 208 facing outwardly.

It will be seen from the foregoing description that the present invention provides a new and improved gas adsorption thermometer which embodies a number of features not shown in similar type thermometers heretofore known and used. In particular, the gas adsorption thermometer 10 of the present invention will be seen to have a novel means for protecting the helical Bourdon tube 72 from vibration and shock, which means is achieved through the provision of a quantity of damping fluid within the chamber containing the Bourdon tube. A very important related feature of the present invention resides in the construction of the bearing assembly 128 which permits the shaft 74 to be rotatably supported in an extremely friction-free manner, yet obviates the need for any fluidtight bushings or packing to prevent the damping fluid from leaking out of the Bourdon tube chamber. Another feature of the present invention resides in the novel construction of the takeoff member 84 which operatively connects the shaft 74 with the Bourdon tube 72 in the manner such that the time and effort required for span adjustments is minimized to the extreme. Additionally, the novel arrangement of the ambient compensator device 208, which is adapted to be nestingly received within the end of the helical Bourdon tube 72, provides a construction which is both positive and effective in operation, yet assumes a minimum amount of space. By virtue of the various above described features of the present invention, the gas adsorption thermometer 10 will be found to be extremely accurate, i.e., in the order of one percent (1 percent) accuracy, as well as being adapted for application under the most adverse conditions, with the result that the thermometer 10 will have a long and effective operational life and find universality of application.

While it will be apparent that the preferred embodiments illustrated herein are well calculated to fulfill the objects above stated, it will be appreciated that the present invention is susceptible to modification, variation and change without departing from the scope of the invention.

I claim:
1. In combination in a gas thermometer,
an external housing,
a temperature-indicating member,
means defining a chamber within said housing, a movable element extending through an opening in said housing having one end thereof disposed within said chamber and the opposite end thereof operatively connected to said indicating member, a multiconvolution helical Bourdon tube disposed within said chamber operably connected to said opposite end of said movable element, and means for damping movement of said Bourdon tube relative to said first-mentioned means against the effect of housing shock and vibration, said last recited means including an enclosure within said chamber providing accommodation for controlled containment of a predetermined quantity of viscous fluid to be contained therein sufficient to at least partially submerge said Bourdon tube while maintaining the fluid level spaced from said opening throughout universal angular orientation of said housing, and relatively viscous fluid of not more than said predetermined quantity disposed within said chamber with at least a portion of one of the convolutions of said Bourdon tube at least partially submerged therein.

2. The combination as set forth in claim 1 wherein said movable element comprises an elongated shaft member rotatably mounted coaxially of said Bourdon tube.

3. The combination as set forth in claim 2 which includes bearing means extending around at least a portion of said shaft member and positioned within said chamber such that at least a portion of said bearing means is out of contact with said fluid regardless of the operative position of the thermometer.

4. The combination as set forth in claim 3 wherein one end of said bearing means is located approximately midway between the opposite ends of said chamber.

5. The combination as set forth in claim 1 wherein said fluid engages at least a portion of each of the convolutions of said Bourdon tube when said housing is disposed in a position wherein the axis of said Bourdon tube extends generally horizontally.

6. The combination as set forth in claim 5 which includes means for adjustably connecting said Bourdon tube to said movable element.

7. The combination as set forth in claim 1 which includes bearing means for movably supporting said element and exposed inward of said chamber, and wherein the predetermined quantity of fluid is maintained free of at least a portion of said bearing means regardless of the angular orientation of the housing.

8. The combination as set forth in claim 7 wherein said movable element comprises an elongated rotatable shaft member, which includes a generally cylindrically shaped bearing member extending coaxially of said Bourdon tube and adapted for rotatable support of said shaft member.

9. The combination as set forth in claim 7 wherein said bearing means comprises an elongated hollow cylindrical member.

10. The combination as set forth in claim 9 wherein said bearing member is positioned inwardly of said Bourdon tube and arranged within said chamber such that a portion thereof remains out of contact with said fluid regardless of the angular orientation of the housing.

11. The combination as set forth in claim 10 which includes means for adjustably connecting said Bourdon tube to said shaft member, and compensation means located inwardly of said Bourdon tube for compensating the relative position of said shaft member with respect to said Bourdon tube in response to changes in ambient temperature.

12. The combination as set forth in claim 11 in which said compensating means comprises a generally spiral bimetallic member intermediately connected between the Bourdon tube and said adjustably connecting means.